(12) United States Patent
Watarai et al.

(10) Patent No.: US 7,039,607 B2
(45) Date of Patent: May 2, 2006

(54) SYSTEM FOR EVALUATING A COMPANY'S CUSTOMER EQUITY

(75) Inventors: Koji Watarai, Tokyo (JP); Tetsuya Kawai, Tokyo (JP)

(73) Assignee: Dentsu Tec Inc., Tokyo (JP)

( * ) Notice: Subject to any disclaimer, the term of this patent is extended or adjusted under 35 U.S.C. 154(b) by 0 days.

(21) Appl. No.: 10/691,558

(22) Filed: Oct. 24, 2003

(65) Prior Publication Data

US 2004/0088185 A1    May 6, 2004

Related U.S. Application Data

(63) Continuation of application No. PCT/JP02/03012, filed on Mar. 27, 2002.

(30) Foreign Application Priority Data

Apr. 26, 2001 (JP) .............................. 2001-130189

(51) Int. Cl.
*G06F 17/60* (2006.01)

(52) U.S. Cl. ............................. 705/35; 705/36; 705/37; 705/1; 705/16; 705/7

(58) Field of Classification Search ................... 705/35, 705/36, 37, 1, 16, 7
See application file for complete search history.

(56) References Cited

U.S. PATENT DOCUMENTS

| 3,865,380 A | * | 2/1975 | Thomas ...................... 273/256 |
| 6,064,985 A | * | 5/2000 | Anderson .................... 705/36 |
| 6,349,290 B1 | * | 2/2002 | Horowitz et al. ............. 705/35 |

FOREIGN PATENT DOCUMENTS

| WO | WO 200014665 A1 | * | 3/2000 |
| WO | WO 200104817 A1 | * | 1/2001 |

OTHER PUBLICATIONS

Anderson et al, Stregthening the satisfaction-profit chain, Nov. 2000, Journal of Service Research, v3n2, pp.: 107-120.*

Azac, Martin G, Takeovers and Equity Derivatives, Spring 1998, American Economist, v42n1, pp.: 101-107.*

* cited by examiner

*Primary Examiner*—John W. Hayes
*Assistant Examiner*—Akiba K. Robinson-Boyce
(74) *Attorney, Agent, or Firm*—Lowe Hauptman & Berner, LLP

(57) ABSTRACT

The object of the present invention is to provide a system for evaluating the customer equity of products and services provided by a company, with consideration of customer-purchase trends, and to provide a means for evaluating the ratio of repeat customers and the customer-equity growth ratio by store, region, and/or customer group, and to provide data for establishing an optimal plan for increasing sales. A system 100 for evaluating customer equity according to the present invention comprises a computer system 2 for conducting sales management for a company, and an evaluation computer 10 connected to the computer system 2 via a communications line 5. The evaluation computer 10 comprises a Web server 11, a communications controller 15, an application server 12, and a database 14 for recording purchase records received from a company or store. The database comprises a table of original records 14a for recording purchase records in the order that they are generated, a master table of customers 14b, and a tabulation table 14c for sorting records by time period. The application server 12 comprises a purchase-data collecting means 12a, a customer-equity sorting means 12b, and a customer-equity evaluation means 12c. The customer-equity evaluation means 12c comprises a total-customer-equity tabulating means 12c-1; an average-customer-equity tabulating means 12c-2; a means of tabulating the customer-stability ratio 12c-3; and a customer-equity growth-ratio tabulating means 12c-4.

6 Claims, 4 Drawing Sheets

SYSTEM FOR EVALUATING A COMPANY'S CUSTOMER EQUITY

RELATED APPLICATION

This application is a continuation of International Application No. PCT/JP02/03012 filed Mar. 27, 2002, which claims priority to Japanese Application No. JP2001-130189 filed Apr. 26, 2001.

DETAILED DESCRIPTION OF THE INVENTION

1. Field of the Invention

The present invention relates to a system for evaluating the customer equity of a company selling merchandise or providing services.

2. Description of the Related Art

Conventionally, a company's business record and growth potential have been evaluated based on sales and assets disclosed in the company's financial statements. Further attention has been given to the company's brand name as an intangible value.

The evaluation of a company's brand assets is an important index for shareholders and investors who are interested in whether the company can secure long-term profits and whether its stock price will experience stable growth. Accordingly, there have been calls to evaluate the brand equity of companies and to list a company's evaluation as an intangible property on that company's balance sheet.

In recent years, however, advertisements have frequently featured, in information media and media on the Internet, products that are similar to or copies of famous brands that individual customers can access. Hence, brand-name companies are exposed to price competition and must counter these advertisements with their own expensive advertisements so as to distinguish their products from the others and to maintain their brand image. However, data concerning trends regarding the value of intangible assets are not available through conventional analyses of brand/product sales.

Further, there has been no data that has been available to assist companies in planning the best strategy for promoting the retention and growth of their brand assets and for determining optimal policies for a store, region, and/or various classifications of customers.

SUMMARY AND OBJECT OF THE INVENTION

In view of the foregoing, one object of the present invention is to provide a system for evaluating the customer equity of products and services provided by a company, with consideration of trends regarding customers' purchases.

Another object of the present invention is to provide a means for determining the repeat-customer ratio and the customer-equity growth ratio by store, region, and/or customer group, and to provide data for establishing an optimal plan for increasing sales.

Another object of the present invention is to identify problems and provide countermeasures thereto concerning the return on customer equity by store, region, and/or customer group, using a matrix of the repeat-customer ratio and the customer-equity growth ratio.

DISCLOSURE OF THE INVENTION

A system for evaluating customer equity according to the present invention comprises: (1) a point-of-sale terminal, provided in a store or a computer system for sales management of a company, that includes an electronic-commercial-transaction device (hereinafter referred to as "e-commerce-transaction device"), and (2) an evaluating computer that is connected to the point-of-sale terminal or computer system via a communications line, including the Internet. The evaluating computer comprises: (1) a Web server connected to the Internet; (2) a communications controller connected to a public communications line; (3) an application server for evaluating customer equity; and (4) a database for recording purchase records received from a company or store. The database comprises: (1) a table of original records, for recording purchase records in the order that they are generated; (2) a master table of customers; and (3) a tabulation table for sorting records by time period. The application server comprises: (1) a purchase-data collecting means for receiving purchase records from the companies and storing and recording these records in the table of original records; (2) a customer-equity sorting means for determining the classifications of customer equity and recording these classifications in the master table of customers; and (3) a customer-equity evaluating means for counting the records in the master table of customers and in the table of original records, and evaluating the customer equity for each company. The customer-equity evaluation means comprises: (1) a total customer-equity tabulating means; (2) an average-customer-equity tabulating means; (3) a customer-stability-ratio tabulating means; and (4) a customer-equity growth-ratio tabulating means.

With this construction, the present invention facilitates the reliable collection of purchase records and can divide the purchase-record data into specified time periods for analysis. Accordingly, the user can quickly analyze the data and formulate countermeasures in order to retain and improve the value of the brand assets of the company.

Further, the customer-equity sorting means performs the following functions: (1) sorting purchase records for a specific brand, product, or stores (that is the target of evaluation) into specific customer classifications; determining the periods and frequency of purchases within an evaluating period divided into prescribed time periods in which repeated purchases or store visits can be expected for the aforementioned specific brand, product, or store; (2) classifying customers in three categories, including repeat customers who have made purchases in the previous and current evaluation periods; ex-customers who have discontinued purchasing; and new customers who have begun purchasing in the current evaluation period; and (3) recording the classification codes for these customers in the master table of customers.

By providing a customer-equity sorting means, the present invention enables the user to track changes in purchase-record data.

Further, the customer-equity evaluation means comprises (1) a total-customer-equity tabulating means, for counting and recording the total number of customers with transactions generated in the evaluating period, based on the purchase records; (2) an average-customer-equity tabulating means, for counting the monetary amounts of all purchases and for calculating and recording the purchase amount per customer; (3) a means of tabulating the customer-stability ratio, for (a) counting only the number of customers and purchase amounts for repeat customers, and (b) calculating and recording the customer-retention ratio represented in the total number of customers and their total purchase amounts; and (4) a customer-equity growth-ratio tabulating means, for (a) counting the number of customers and their purchase amounts in the previous evaluating period for ex-customers who made purchases in the previous evaluating period but none in the current evaluating period, (b) calculating and recording the total number of ex-customers and their purchase amounts, (c) calculating the number of new customers who began purchasing in the current evaluating period and their purchase amounts in this period, and (d) calculating and recording the ratios of new customers and their purchase amounts to ex-customers and their purchase amounts.

With this construction, means of tabulating the total of customer assets enables a user to track changes in the absolute number of customers for use as an index to the total customer assets of a brand. The means of tabulating the average of customer assets can track changes in the absolute value of purchase worth per customer. The means of tabulating the customer-stability ratio can track the ratio of and changes in the profit stability for customer assets based on the customer-stability ratio. The means of tabulating the customer-asset growth ratio can track the ratio and rate of growth for a brand.

Further, the purchase records include at least one of a store code, a region code, or a purchase-classification code, and customer equity is evaluated according to such a code.

By comparing data for the same brand by store, region, or purchase classification, the system of the present invention can compare successful stores and regions having excellent customer assets to stores and regions with declining customer assets. The system can further extract successful sales policies (successful experiences) for application to other companies.

BEST MODE FOR CARRYING OUT THE INVENTION

One preferred embodiment of the present invention will be described while referring to the accompanying drawings.

Figure 1:
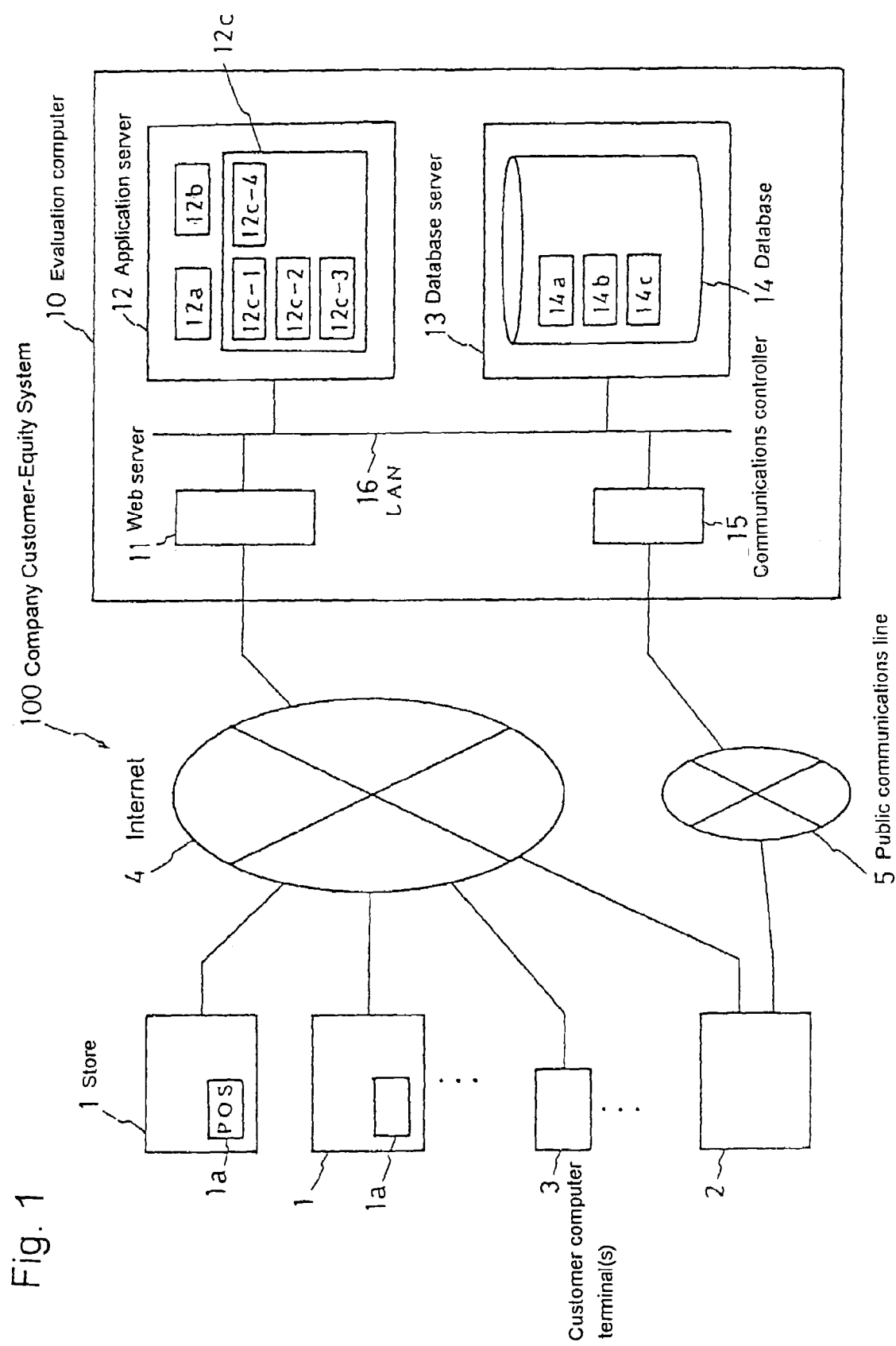
FIG. 1 is a conceptual diagram showing the construction of a system for evaluating a company's customer assets according to the present invention.

FIG. 1 is a conceptual diagram showing the construction of a company's customer-asset evaluation system 100 The system 100 includes: a store 1; a point-of-sale (POS) terminal 1a that is provided in the store 1 and that can be connected to the Internet; a computer system 2 that is used for sales management in the company; a customer computer terminals 3 that can be connected to the Internet; the Internet 4; and a public communications line 5. The computer system 2 includes an e-commerce-transaction device for receiving orders from customer computer terminals 3 via the Internet 4. The computer system 2 also collects various purchase records, including records received from the store 1 and records acquired through electronic transactions.

An evaluation computer 10 is connected to either the Internet 4 or the communications line 5 for receiving purchase records from the computer system 2. Accordingly, the evaluation computer 10 comprises a Web server 11 that includes a firewall connected to the Internet 4, a communications controller 15 including a modem connected to the communications line 5, an application server 12 for controlling the evaluation process, and a database server 13 for controlling a database 14. The application server 12 and database server 13 are connected to the Web server 11 and the communications controller 15 via a LAN 16.

The database 14 comprises a table of original records 14a for recording purchase records in the order that they are generated, a master table of customers 14b, and a tabulation table 14c sorted by time period.

The application server 12 comprises a purchase-data collecting means 12a for receiving purchase records from either the computer system used for company sales management or the POS terminal at the store, and recording this data in the table of original records 14a; a customer-equity sorting means 12b for determining the customer-equity classification and recording the customer-equity data in the master table of customers 14b; and a customer-equity evaluation means 12c for counting entries in the master table of customers 14b and table of original records 14a so as to evaluate customer equity.

The customer-equity evaluation means 12c further comprises a total-customer-equity tabulating means 12c-1, an average-customer-equity tabulating means 12c-2, a means of tabulating the customer-stability ratio 12c-3, and a customer-equity growth-ratio tabulating means 12c-4.

The customer-equity sorting means 12b of the present invention has the following functions: (1) sorting purchase records for a specific brand, product, or store that is the target of evaluation into specific customer classifications; (2) determining the periods and frequency of purchase-record occurrences within an evaluating period divided into prescribed time periods in which repeated purchases or store visits can be expected for the specific brand, product, or store. Customers are classified into three categories, including repeat customers, who have repeated purchases in the previous and current evaluation periods; ex-customers, who have discontinued purchasing; and new customers, who have begun purchasing in the current evaluation period. The classification codes for these customers are stored in the master table of customers.

Figure 2:
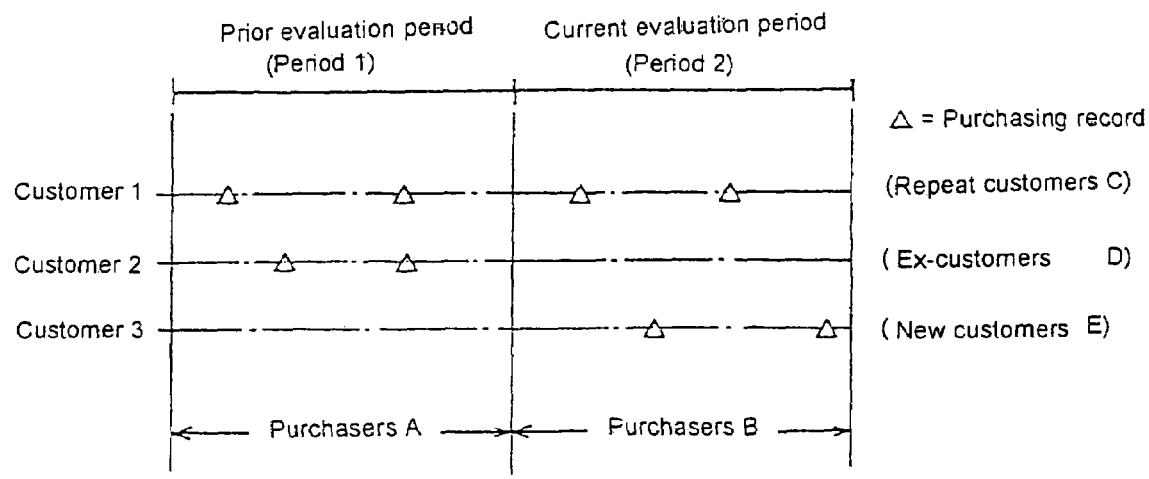
FIG. 2 is an explanatory diagram showing the categories of customer equity according to the present invention.

FIG. 2 is an explanatory diagram showing the categories of customer equity. The □ symbol indicates a purchase record. The horizontal axis indicates the evaluation periods over time, showing the previous evaluation period (Period 1) and the current evaluation period (Period 2). Customer 1 has two purchase records □ in Period 1 and two in Period 2. Customer 2 has two purchase records □ in Period 1, but none in Period 2. Customer 3 has only two purchase records □ in Period 2. According to this data, the customer-equity sorting means 12b categorizes Customer 1 as a repeat customer C, Customer 2 as an ex-customer D, and Customer 3 as an new customer E.

The total number of customers with purchase records □ in Period 1, that is, the purchasers A of Period 1 is equivalent to the sum of the repeat customers C and ex-customers D. The total purchasers B in Period 2 is the sum of the repeat customers C and new customers E.

Figure 3:
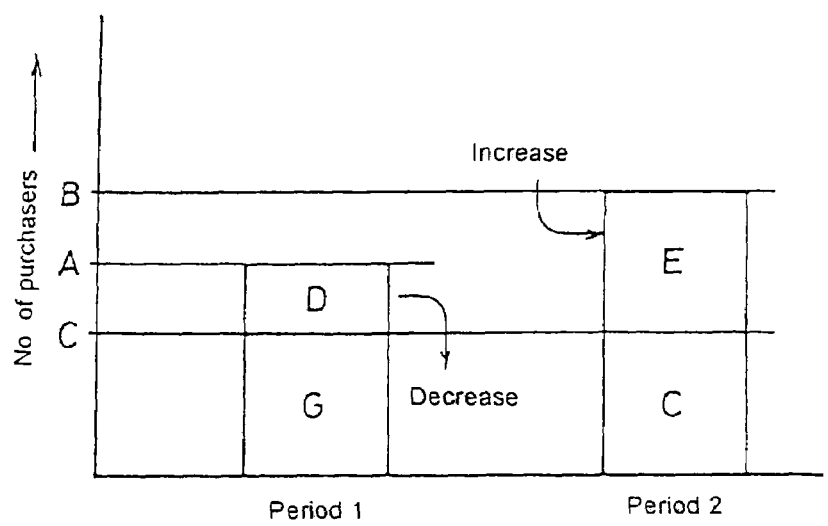
FIG. 3 is an explanatory diagram showing the sorting method of the present invention.

FIG. 3 is an explanatory diagram showing the sorting method of the present invention. This diagram categorizes shifts in the number of purchasers from Period 1 to Period 2. The vertical axis indicates the number of purchasers, while the horizontal axis shows the transition between periods. This example shows an increase in the total number of purchasers B in Period 2 in relation to the total number of purchasers A in Period 1. As shown by the passage of periods in the diagram, the total number of purchasers A in Period 1 include ex-customers D that did not make purchases in Period 2, while the total number of purchasers B in Period 2 comprises new customers E, who began purchase in this period, and repeat customers C.

The customer-equity evaluation means 12c will now be described in greater detail. Based on purchase records in Period 1 and Period 2, the total-customer-equity tabulating means 12c-1 counts the total number of customers having a purchase transaction in each period and records these counts in the tabulation table 14c.

The average-customer-equity tabulating means 12c-2 counts the monetary amounts of purchase transactions generated in each period based on the purchase records for Periods 1 and 2 and records this data in the tabulation table 14c. The average-customer-equity tabulating means 12c-2 also reads the total number of customers for Periods 1 and 2 that are already counted and recorded in the tabulation table 14c, calculates the purchase amount per customer for each Period 1 and 2, and records this data in the tabulation table 14c.

The means of tabulating the customer-stability ratio 12c-3 counts only the number of customers and purchase amounts for the repeat customers C and records this data in the tabulation table 14c. The means of tabulating the customer-stability ratio 12c-3 also reads the total number of customers and total purchase amounts for Periods 1 and 2 as recorded in the tabulation table 14c, calculates the customer-retention ratio represented by the repeat customers, and records this data in the tabulation table 14c.

The customer-equity growth-ratio tabulating means 12c-4 counts the number of customers and total amount of purchases in the previous evaluating period (Period 1) for ex-customers D who made purchases in the previous evaluating period but made no purchases in the current evaluating period (Period 2) and records the number of ex-customers and their purchase amounts in the tabulation table 14c. The customer-equity growth-ratio tabulating means 12c-4 also counts the number of customers and purchase amounts in the current purchasing period (Period 2) for new customers E who began purchasing in the current evaluating period (Period 2) and records the number of new customers and their purchase amounts in the tabulation table 14c. The customer-equity growth-ratio tabulating means 12c-4 next calculates the ratios of new customers and their purchase amounts to ex-customers and their purchase amounts and records these ratios in the tabulation table 14c.

The customer-equity evaluation means 12c creates the tabulation table 14c based on a designation code, such as a store code, region code, or purchase-classification code.

Figure 4:
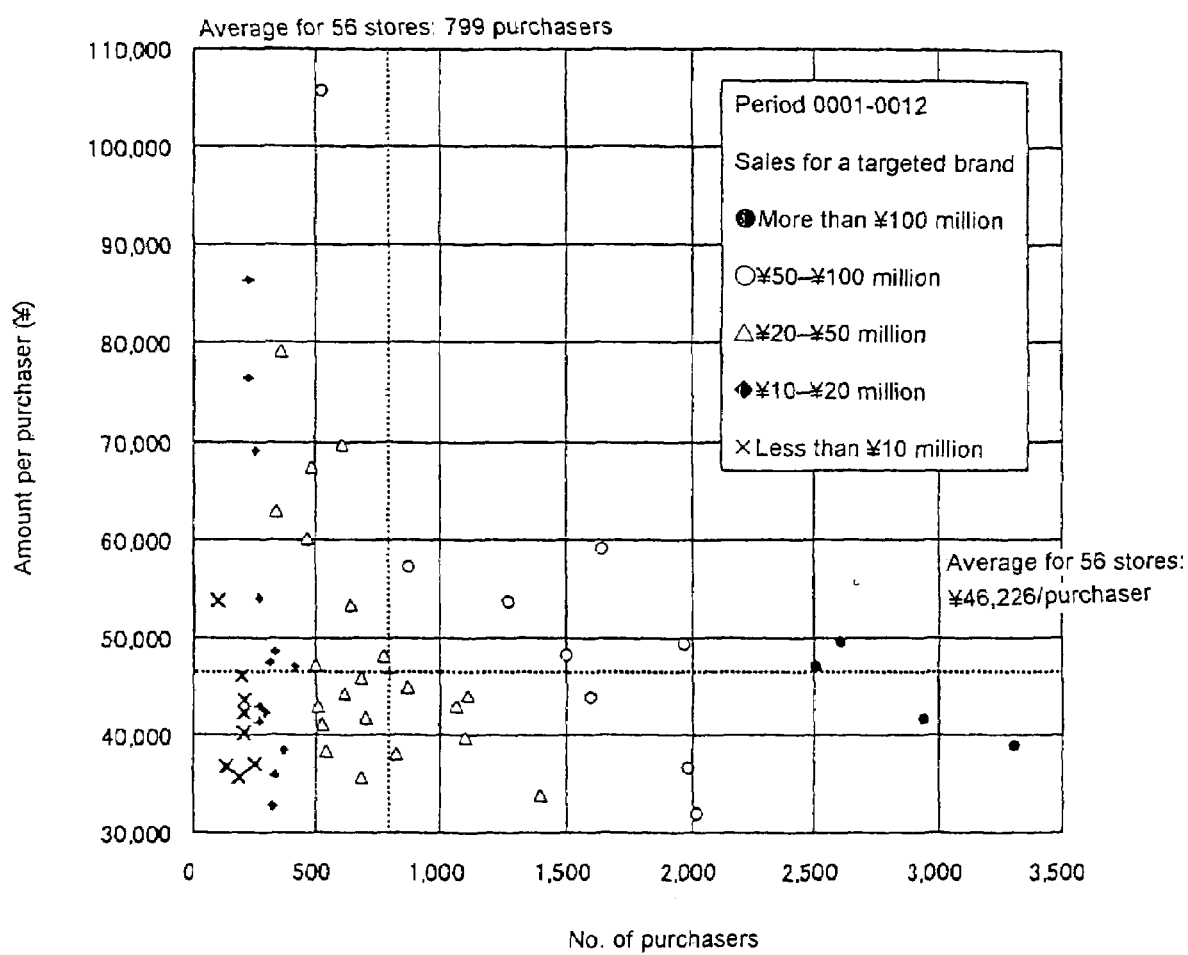
FIG. 4 is an explanatory diagram showing a matrix for store analysis according to a preferred embodiment of the present invention.
Figure 5:
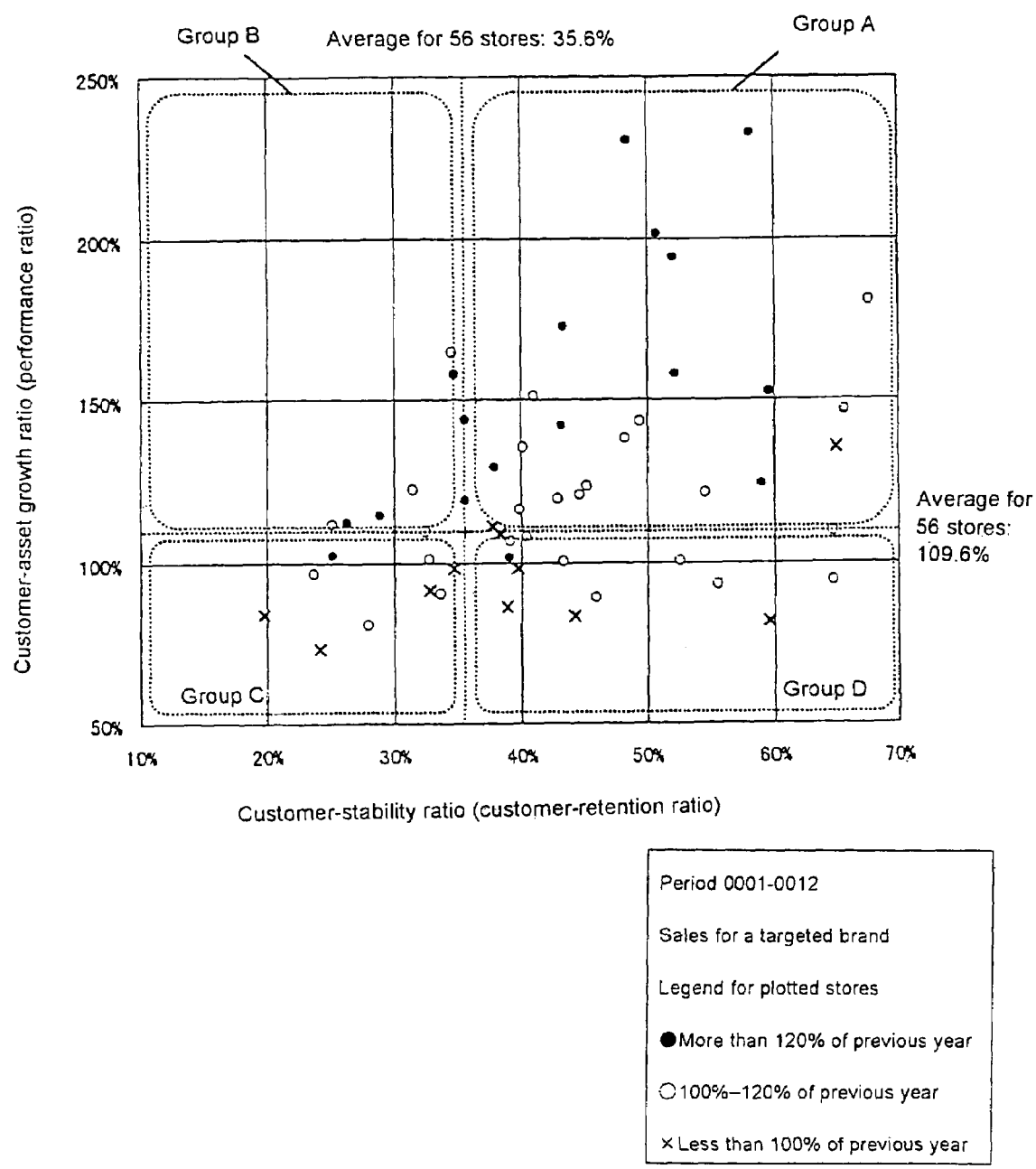
FIG. 5 is an explanatory diagram showing a variation of the matrix for store analysis according to the preferred embodiment.

FIGS. 4 and 5 each show an analytical matrix of the present embodiment created based on records in the tabulation table 14c that are sorted by store.

Records for each store are plotted in the analytical diagram of FIG. 4, wherein the vertical axis represents the purchase amount per customer tabulated and recorded by the average-customer-equity tabulating means 12c-2, and the horizontal axis represents the total number of customers tabulated and recorded by the total-customer-equity tabulating means 12c-1. In this diagram, the position of each store is represented by a black circle, white circle, triangle, diamond, or cross, according to the sales rank of a store (number of customers x purchase amount per customer).

It is possible to determine whether each store's policy for promoting sales should emphasize acquiring customers or taking measures to increase the purchase amount per customer, based on the monetary equity for each store, the average equity per customer patronizing the store, and the total number of customers. Further, it is possible to optimize the sales-promotion policy of stores with few customers by adopting policies of stores that successfully retain many customers.

Records for each store are plotted in the analytical diagram of FIG. 5, wherein the horizontal axis represents the ratio of retained customers, who are repeat customers as tabulated and recorded by the means of tabulating the customer-stability ratio 12c-3, while the vertical axis represents the ratios of the number of new customers and their purchase amounts to the number of ex-customers and their purchase amounts as tabulated and recorded by the customer-equity growth-ratio tabulating means 12c-4. In this diagram, the position of each store is represented by a black circle, white circle, or cross, according to the sales rank of a store (number of customers x purchase amount per customer).

The vertical axis of this analytical diagram represents the customer-equity growth ratio (performance ratio), wherein the number rises as new customers are acquired. The horizontal axis represents the customer-stability ratio (customer-retention ratio), wherein the customer base is more stable toward the right.

The average performance ratio and average customer-retention ratio for all stores are indicated by dotted lines. This diagram enables one to evaluate the customer equity for each group A, B, C, and D indicated in the diagram, in order to form a basic strategy for each store.

Group A, for example, indicates superior stores showing stable growth that exceeds the average for all stores in regard to both customer retention and growth. Therefore, stores in Group A can be said to have excellent customer assets. By elucidating the factors leading to the success of this group, such factors can be applied to other problematic stores to increase the customer assets of all businesses.

Group B has an extremely high customer-asset growth ratio, but an extremely low customer-stability ratio. While showing positive activity, this group must adopt measures to cultivate and retain customers, in order to prevent loss of customers.

Group C includes stores in decline, wherein both the customer-stability ratio and customer-asset growth ratio are below average. These problematic companies must first invest more to retain customers.

Group D indicates mature companies with a high customer-retention ratio, but outdated stores having few new customers. Although the above example is a comparison of stores, it is obvious that the present invention can also be applied to an analysis of companies conducting similar businesses or an analysis of companies conducting different businesses.

INDUSTRIAL APPLICABILITY

The present invention's system for evaluating a company's customer equity facilitates the reliable collection of purchase records and can divide the record data into time periods for analysis. Accordingly, a user can quickly analyze the data and formulate measures in order to retain and improve the brand assets of the company.

Further, means of tabulating the total of customer assets enables a user to track changes in the absolute number of customers for use as an index to the total customer assets of a brand. The means of tabulating the average of customer assets can track changes in the absolute value of purchase worth per customer. The means of tabulating the customer-stability ratio can track the ratio of and changes in the profit stability for customer assets based on the customer-stability ratio. The means of tabulating the customer-asset growth ratio can track the ratio and rate of growth for a brand.

By comparing data for the same brand by store, region, or purchase classification, the system of the present invention can compare successful stores and regions having excellent customer assets with stores and regions whose customer assets are declining. The system can further extract successful sales policies (successful experiences) for application to other companies.

EXPLANATION OF REFERENCES 1 store
1a point-of-sale (POS) terminal
2 computer system that is used for sales management in the company
3 customer computer terminals
4 Internet
5 public communications line
10 evaluation computer
11 Web server
12 application server
12a purchase-data collecting means
12b customer-equity sorting means
12c customer-equity evaluation means
12c-1 total-customer-equity tabulating means
12c-2 average-customer-equity tabulating means
12c-3 means of tabulating the customer-ratio tabulating means
12c-4 customer-equity growth-ratio tabulating means
13 database server
14 database
14a table of original records
14b master table of customers
14c tabulation table
15 communications controller
16 LAN
100 company's customer-asset evaluation system of this invention

What is claimed is:

1. A system for evaluating a company's customer equity, comprising:
an information input system including an e-commerce-transaction device, and an evaluating computer connected to the information input system;
wherein the evaluating computer comprises:
a Web server connected to the Internet;
a communications controller connected to a public communications line;
an application server for performing customer-equity evaluations; and
a database for recording purchase records received from the information input system; the database comprises:
a table of original records for recording purchase records in the order that they are generated;
a master table of customers; and
a tabulation table for sorting records by time period;
the application server comprises:
a purchase-data collecting means for receiving purchase records from companies and stores and records these records in the table of original records;
a customer-equity sorting means for determining the classification of individual-customer equity and recording these classifications in the master table of customers; and
a customer-equity evaluation means for counting the records in the master table of customers and in the table of original records and evaluating the customer equity for each company;
the customer-equity evaluation means comprises:
a total-customer-equity tabulating means;
an average customer-equity tabulating means;
a means of tabulating the customer-stability ratio; and
a customer-equity growth-ratio tabulating means;
the customer-equity sorting means performs the following functions:
(1) sorting, into specific customer classifications, purchase records for a specific brand, product, or store that is the target of evaluation;
(2) determining the periods and frequency of purchase-record occurrences within an evaluation period that is divided into prescribed time periods in which repeated purchases or store visits can be expected for the specific brand, product, or store that is the target of evaluation;
(3) classifying customers into the three categories of (a) repeat customers, who are those who have made purchases in both the previous and current evaluation periods, (b) ex-customers, who made purchases in the previous evaluation period but who have made no purchases in the current evaluation period; and (c) new customers, who have begun making purchases in the current evaluation period; and
(4) recording the classification codes for these customers in the master table of customers;
the customer-equity evaluation means comprises:
a total-customer-equity tabulating means for counting and recording the total number of customers who, based on the purchase records, had transactions during the evaluation period;
an average-customer-equity tabulating means for counting the monetary amounts of all purchases and for calculating and recording the purchase amount per customer;
a first analytical matrix, in which are plotted said targets of evaluation after being ranked and assigned symbols according to a ranking classification, and in which said matrix the vertical axis represents the purchase amount per customer as tabulated and recorded by said average-customer-equity tabulating means, and the horizontal axis represents the total number of customers as tabulated and recorded by said total-customer-equity tabulating means;
a means of tabulating the customer-stability ratio, for counting only the number of customers and purchase amounts for repeat customers, and for calculating and recording a customer-retention ratio as represented by the total number of customers and their total purchase amounts;
a customer-equity growth-ratio tabulating means that performs the following functions:
(1) counting the number of ex-customers (and calculating their purchase amounts) who made purchases in the previous evaluation period but made no purchases in the current evaluation period;

(2) calculating and recording the cumulative totals of the number of such ex-customers and their purchase amounts;

(3) counting the number of new customers (and calculating their purchase amounts) who began making purchases in the current evaluation period;

(4) calculating and recording the cumulative totals of the number of such new customers and their purchase amounts; and (5) calculating and recording the ratios of new customers and their purchase amounts to ex-customers and their purchase amounts; and a second analytical matrix, in which the sales-improvement ratios of said targets of evaluation are classified into rankings of the targets of evaluation in terms of ratios of increase, stability, and decrease of sales before and after an evaluation period, and in which symbols are plotted according to rankings, and wherein the horizontal axis represents the ratio of retained customers, who are repeat customers as tabulated and recorded by said means of tabulating the customer-stability ratio, while the vertical axis represents the ratios of the number of new customers and their purchase amounts to the number of ex-customers and their purchase amounts as tabulated and recorded by said customer-equity growth-ratio tabulating means.

2. A system for evaluating customer equity as recited in claim 1, wherein the purchase records include at least one of a store code, a region code, or a purchase-classification code, and customer equity is evaluated according to such a code.

3. The system of claim 1, wherein the information input system is a point-of-sale terminal.

4. The system of claim 1, wherein the information input system is a sales management computer system.

5. The system of claim 1, wherein said information input system is a point-of-sale terminal.

6. The system of claim 1, wherein said information input system is a sales management computer system.

* * * * *